(12) United States Patent
Narumi

(10) Patent No.: US 11,124,153 B2
(45) Date of Patent: Sep. 21, 2021

(54) DRIVER CONDITION ESTIMATION DEVICE

(71) Applicant: KABUSHIKI KAISHA TOKAI RIKA DENKI SEISAKUSHO, Aichi (JP)

(72) Inventor: Kenji Narumi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 329 days.

(21) Appl. No.: 16/339,255

(22) PCT Filed: Oct. 4, 2017

(86) PCT No.: PCT/JP2017/036155
§ 371 (c)(1),
(2) Date: Apr. 3, 2019

(87) PCT Pub. No.: WO2018/070321
PCT Pub. Date: Apr. 19, 2018

(65) Prior Publication Data
US 2020/0039468 A1 Feb. 6, 2020

(30) Foreign Application Priority Data

Oct. 11, 2016 (JP) ............................ JP2016-199793

(51) Int. Cl.
*B60R 22/48* (2006.01)
*B60W 40/08* (2012.01)
(52) U.S. Cl.
CPC ............. *B60R 22/48* (2013.01); *B60W 40/08* (2013.01); *B60R 2022/4808* (2013.01); *B60W 2040/0827* (2013.01)

(58) Field of Classification Search
CPC .......... B60R 22/48; B60R 2022/4808; B60W 40/08; B60W 2040/0827
See application file for complete search history.

(56) References Cited

U.S. PATENT DOCUMENTS

| 6,385,517 | B1 * | 5/2002 | Kore | B60N 2/002 |
| | | | | 701/45 |
| 6,976,708 | B2 * | 12/2005 | Aoki | B60R 22/44 |
| | | | | 280/807 |
| 2007/0018445 | A1 * | 1/2007 | Inuzuka | B60R 22/44 |
| | | | | 280/806 |

(Continued)

FOREIGN PATENT DOCUMENTS

| JP | 2005-173635 A | 6/2005 |
| JP | 2016-027452 A | 2/2016 |
| JP | 2016-045714 A | 4/2016 |

OTHER PUBLICATIONS

International Search Report issued in corresponding International Application No. PCT/JP2017/036155 dated Jan. 16, 2018.

*Primary Examiner* — Kam Wan Ma
(74) *Attorney, Agent, or Firm* — Roberts Calderon Safran & Cole P.C.

(57) ABSTRACT

A driver condition estimation device includes an estimation unit configured to trigger an event that a webbing of a seat belt device is retracted, and to estimate a condition of a driver based on an amount of retraction of the webbing in the event.

12 Claims, 8 Drawing Sheets

(56) References Cited

U.S. PATENT DOCUMENTS

2016/0086391 A1\* 3/2016 Ricci ................... G06Q 10/10
 701/29.3
2017/0158054 A1\* 6/2017 Munaoka ............... B60R 22/48
2017/0161576 A1 6/2017 Banno et al.

\* cited by examiner

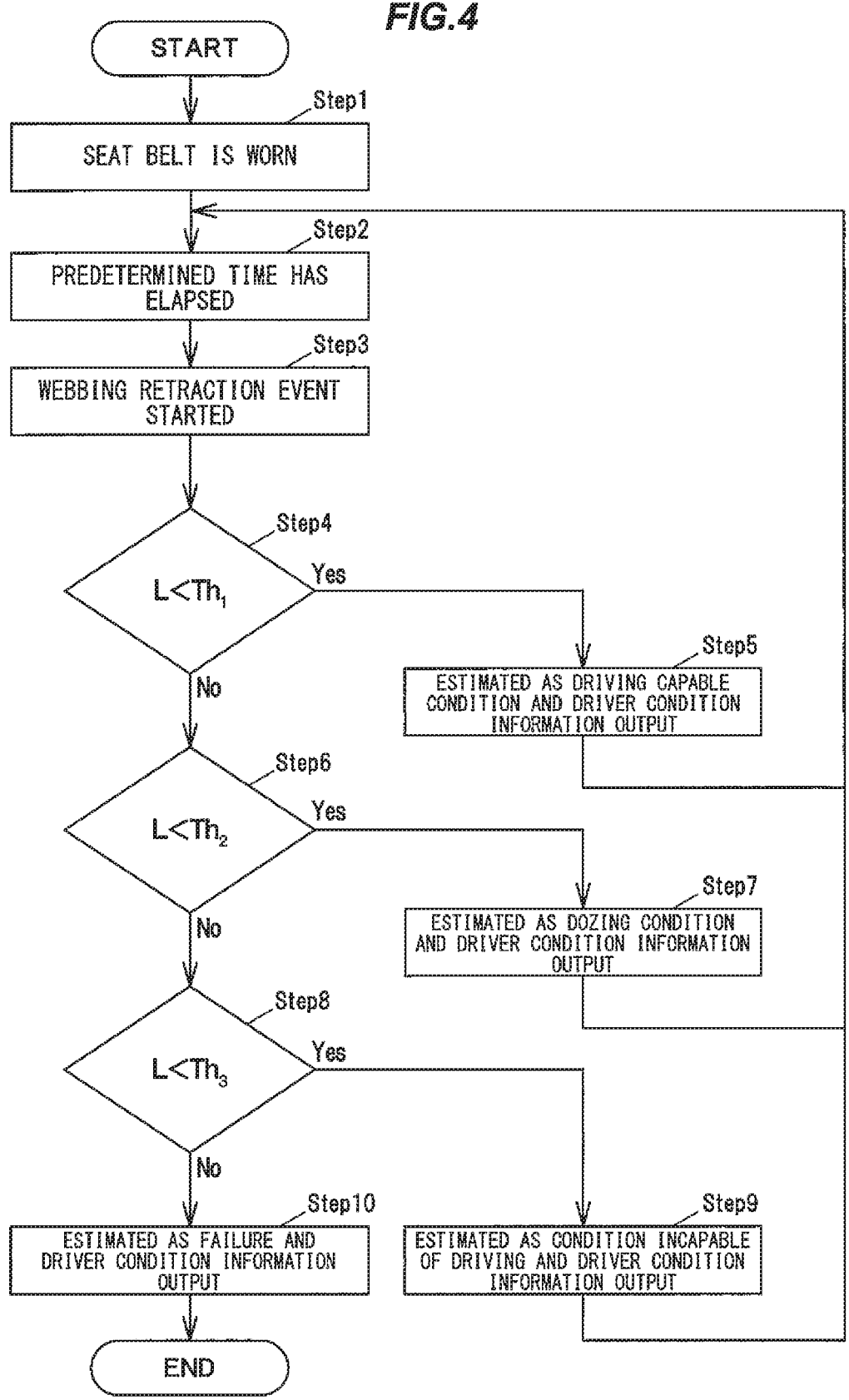

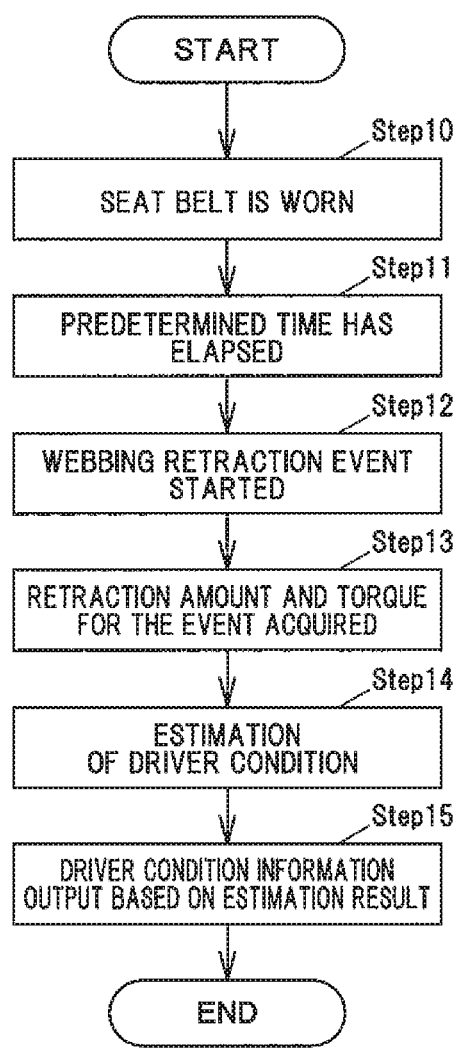

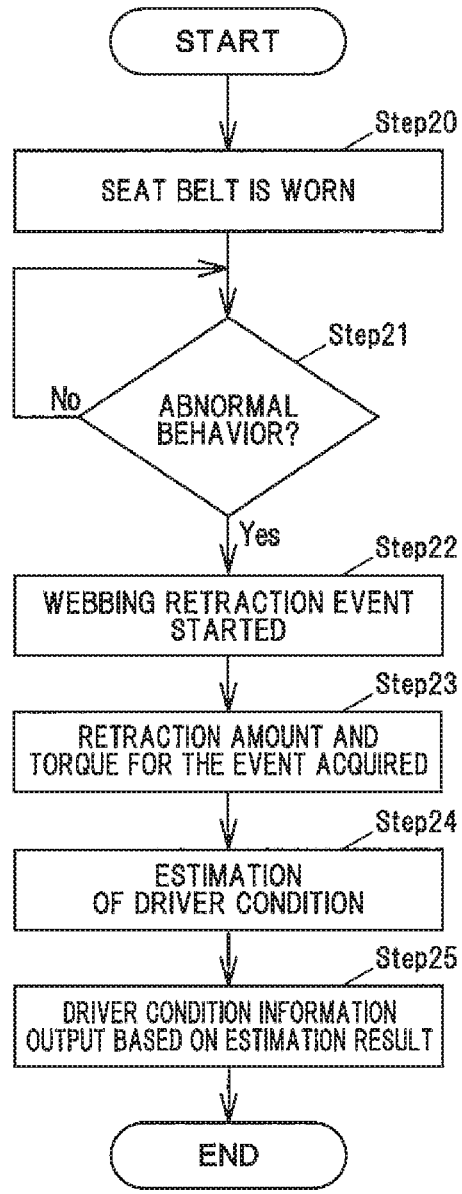

DRIVER CONDITION ESTIMATION DEVICE

CROSS-REFERENCE TO RELATED APPLICATIONS

The present application is a U.S. National Phase of PCT/JP2017/036155 filed on PCT/JP2017/036155 claiming priority to Japanese Patent Application No. 2016-199793 filed on Oct. 11, 2016. The disclosure of the PCT Application is hereby incorporated by reference into the present Application.

CROSS-REFERENCE TO RELATED APPLICATIONS

The present application claims the priority of Japanese patent application No. 2016-199793, and the entire contents of Japanese patent application No. 2016-199793 are incorporated by reference in the present application.

TECHNICAL FIELD

The present invention relates to a device for estimating a condition of a driver.

BACKGROUND ART

Known is a dozing detection device including a monitoring means for directly monitoring a posture of an upper body of a driver and a determining means for determining whether the posture is different from that of a normal driving based on this monitoring (for example, refer to Patent Document 1).

The determining means of the dozing detection device determines that the posture is different from that of a normal driving when the pulled out amount of the seat belt is equal to or greater than a predetermined amount, and that condition continues for a predetermined period of time or longer.

CITATION LIST

Patent Document

Patent Document 1: JP 2005/173635 A

SUMMARY OF INVENTION

Technical Problem

Since the dozing detection device disclosed in Patent Document 1 constantly monitors the pulled-out amount of the seat belt, when the driver leans forward, or the like, resulting in an increased pulled-out amount, the posture can be misjudged as different from that of a normal driving.

An object of the invention is to provide a device for estimating a condition of a driver that is capable of suppressing misestimates of the condition of the driver.

Solution to Problem

A device for estimating a condition of a driver according to an embodiment of the invention includes an estimation unit configured to cause an event in which a webbing of a seat belt device is retracted, and to estimate the condition of the driver based on retraction amount of the webbing during the event.

Advantageous Effects of Invention

According to an embodiment of the invention, a device for estimating a condition of a driver that suppresses misestimates of the condition of a driver, can be provided.

BRIEF DESCRIPTION OF DRAWINGS

FIG. 4 is a flowchart illustrating an example of operations of the device for estimating a condition of a driver according to the first embodiment.

FIG. 6 is a flowchart illustrating an example of the operations of the device for estimating a condition of a driver according to the second embodiment.

FIG. 8 is a flowchart illustrating an example of the operations of the device for estimating a condition of a driver according to the third embodiment.

DESCRIPTION OF EMBODIMENTS

Overview of Embodiments

A device for estimating a condition of a driver includes an estimation unit configured to cause an event in which a webbing of a seat belt device is retracted, and estimate the condition of the driver based on a retraction amount of the webbing during the event.

The device for estimating a condition of a driver is configured to cause an event in which the webbing is retracted, and estimate the condition of the driver based on the retraction amount during the event. For this reason, compared with the case without this configuration, the misestimates caused by the webbing being pulled out as the driver changes his/her posture or grabs an object, or the like, can be suppressed.

First Embodiment

Summary of Device for Estimating Condition of Driver 1

Figure 1A:
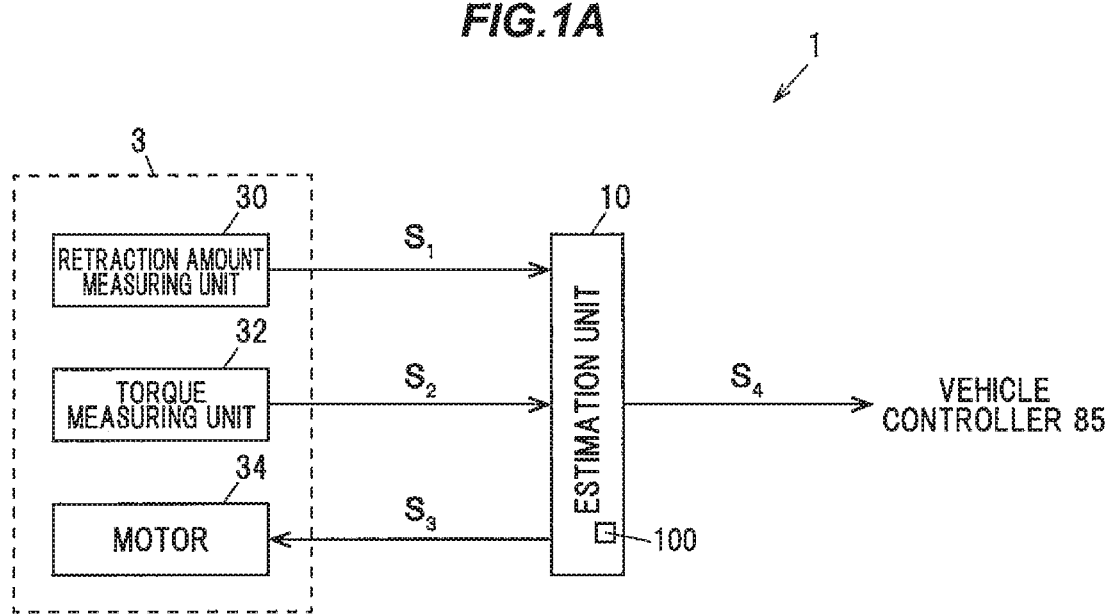
FIG. 1A is a block diagram illustrating an example of a device for estimating a condition of a driver according to a first embodiment.
Figure 1B:
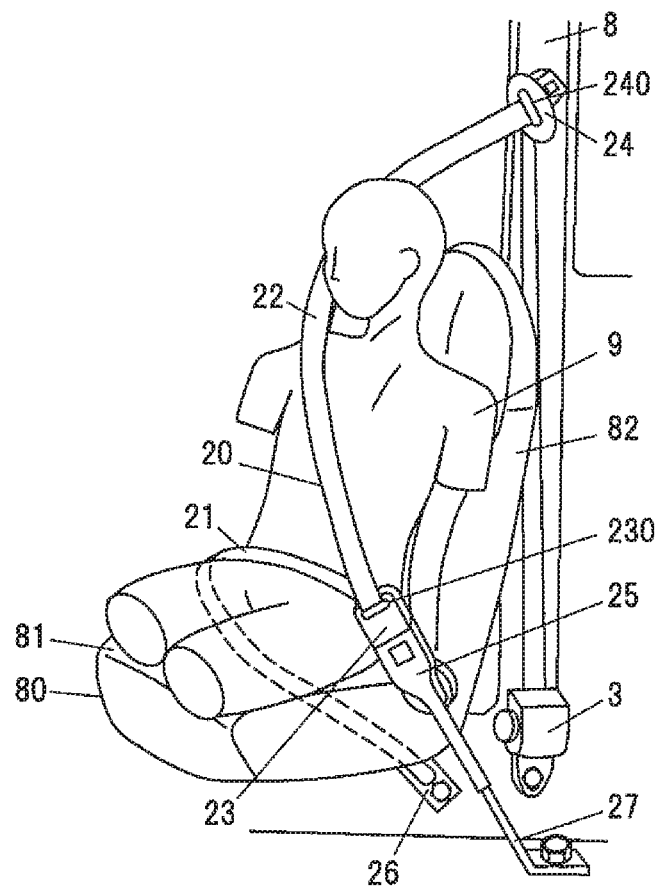
FIG. 1B is an explanatory diagram for explaining an example of a configuration of a seat belt device.
Figure 2:
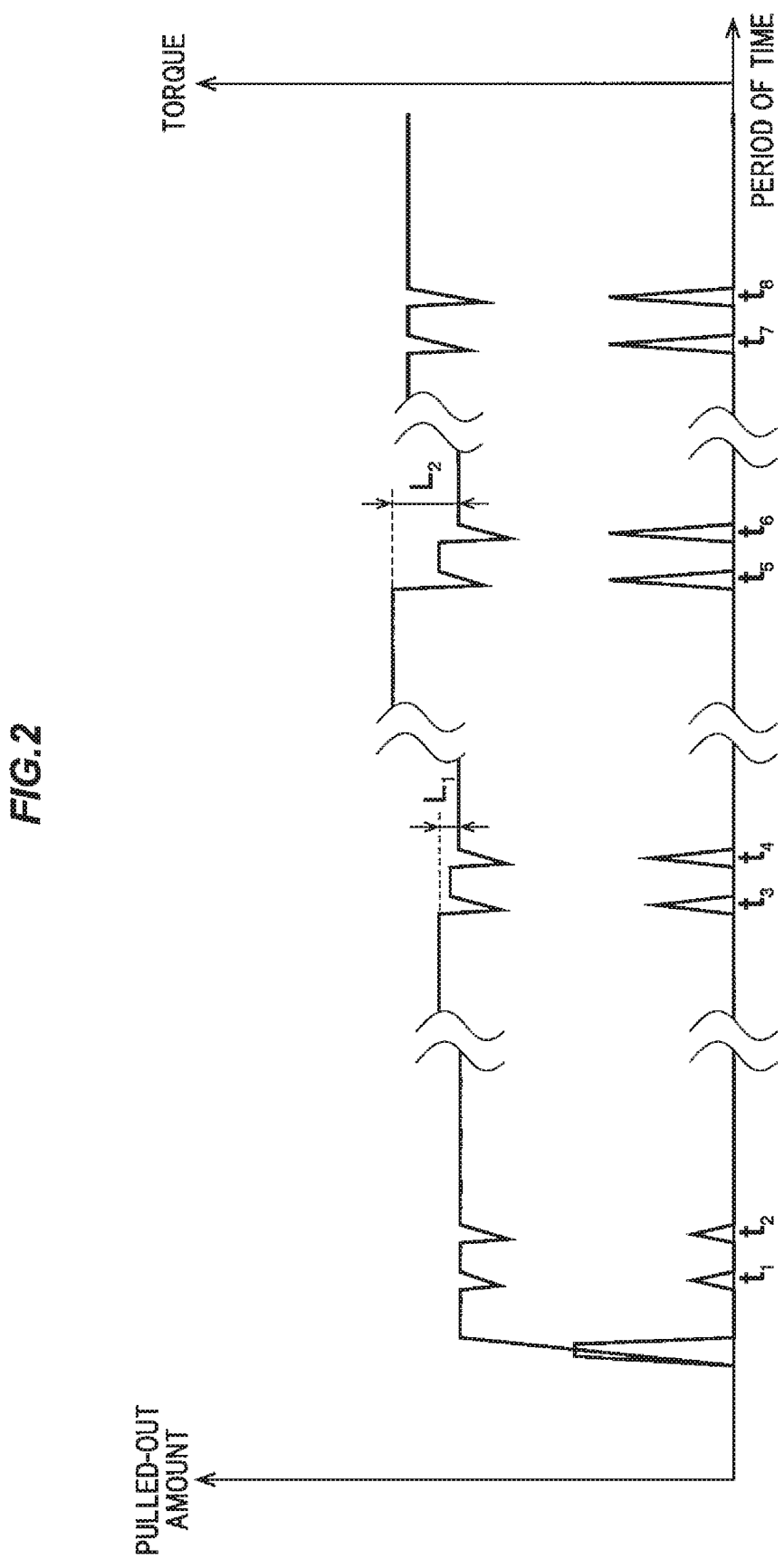
FIG. 2 is a graph illustrating an example of a relationship between a pulled-out amount of a webbing and torque in an event caused by a device for estimating a condition of a driver according to the first embodiment.

FIG. 1A is a block diagram illustrating an example of a device for estimating a condition of a driver according to a first embodiment, and FIG. 1B is an explanatory diagram for explaining an example of a configuration of a seat belt device. FIG. 2 is a graph illustrating an example of the relationship between the pulled-out amount of the webbing and the torque in the event generated by the device for estimating a condition of a driver according to the first embodiment. In FIG. 2, the left side of the vertical axis represents the pulled-out amount, and the right side axis represents the torque, and a horizontal axis represents the time. In addition, in FIG. 2, the difference between the pulled-out amounts before and after the event is a retraction amount L. In the drawings associated with the following embodiments, ratios between elements in the drawings may be different from the actual ratios. In addition, in FIG. 1A, arrows indicate the flows of primary signals, information, and the like.

The device for estimating a condition of a driver 1 according to the present embodiment is configured to estimate as the condition of the driver, at least, a condition capable of driving, a dozing condition, and a condition incapable of driving. The device for estimating a condition of a driver 1 is configured to estimate the condition of a driver 9 using a seat belt device 2 of a driver seat 80 of a vehicle 8, as illustrated in FIGS. 1A and 1B, for example.

The condition capable of driving indicates, as an example, a state in which the consciousness level of the driver is in an awake state and the driver is presumed to be able to operate normally. The dozing condition indicates, as an example, a state in which the consciousness level of the driver is in a state of somnolence and the driver is presumed to have fallen asleep when left unattended. The condition incapable of driving indicates, as an example, a state in which the consciousness level of the driver is in a state of benumbing, the driver responds to external stimulus but is asleep, or does not respond to stimulus, and thus the driver is presumed to be incapable of driving. Note that the conditions of the driver are not limited thereto, and may be further divided into a plurality of conditions, or the conditions of the driver may be classified according to other indexes indicating drowsiness.

As illustrated in FIG. 1B, for example, the seat belt device 2 includes a webbing 20 which is a wide belt, a tongue portion 23 having an insertion hole 230 into which the webbing 20 is inserted, a buckle portion 25 coupled to the tongue portion 23, and a retractor 3 for winding the webbing 20.

One end of the webbing 20 is attached to the vehicle 8 by an attachment portion 26. The other end of the webbing 20 is inserted into an insertion hole 240 of a shoulder anchor 24 that is attached to a pillar of the vehicle 8, and then attached to a bobbin of the retractor 3. The retractor 3 is configured to rotate the bobbin by a motor 34 so as to retract, namely to wind the webbing 20. The buckle portion 25 is attached to the vehicle 8 by an attachment portion 27.

The retractor 3 includes a retraction amount measuring unit 30, a torque measuring unit 32, and a motor 34, as illustrated in FIG. 1A, for example. The retraction amount measuring unit 30 is configured to measure the retraction amount L in the retraction event of the webbing 20, and to output the retraction amount information $S_1$, which is the information on the measured retraction amount L, to an estimation unit 10. The retraction amount L is measured, for example, based on a rotation amount of the bobbin.

The torque measuring unit 32 is configured to measure the torque at the time of retracting the webbing 20, and to output the torque information $S_2$, which is information on the measured torque, to the estimation unit 10. The torque is measured, for example, based on a current flowing to the motor 34.

The motor 34 is configured to rotate the bobbin. The estimation unit 10 outputs a driving signal $S_3$ to the motor 34 at the time of event and causes the webbing 20 to be retracted. The driving signal $S_3$ is, for example, a rectangular wave signal, a sine wave signal, a pulse width modulation (PWM) signal, or the like.

As illustrated in FIG. 1A, the device for estimating a condition of a driver 1 includes the estimation unit 10 configured to cause an event in which the webbing 20 of the seat belt device 2 is retracted, and to estimate the condition of the driver based on the retraction amount L of the webbing 20 during the event.

For example, as illustrated in FIG. 1A, the estimation unit 10 is electrically connected to the retractor 3 of the seat belt device 2.

Configuration of Estimation Unit 10

Figure 3:
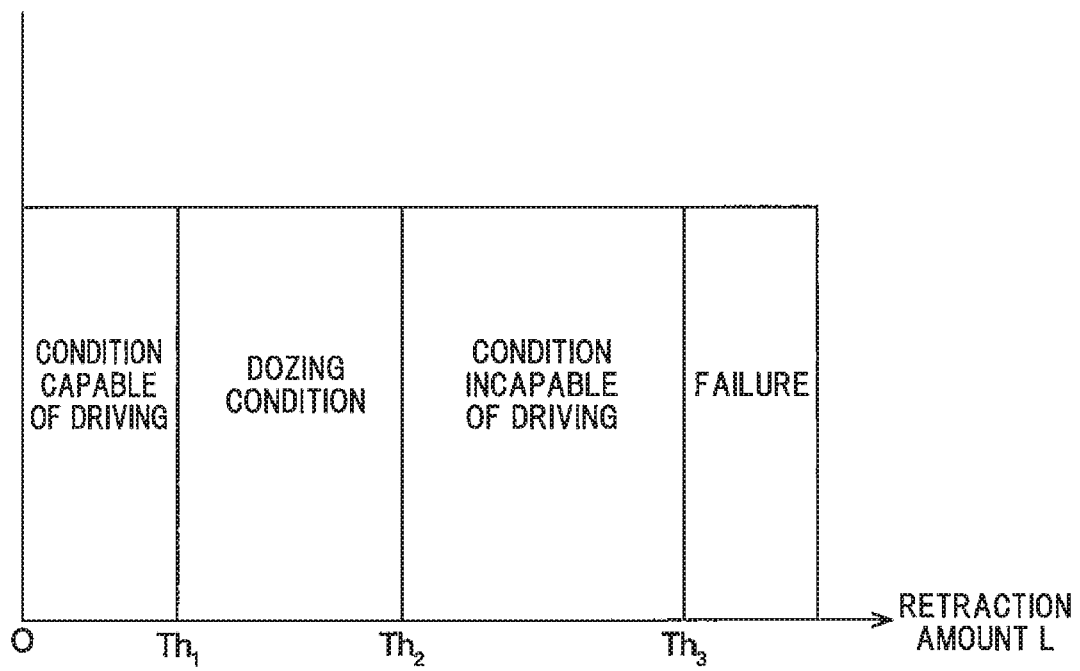
FIG. 3 is an explanatory diagram illustrating an example of a relationship between a first threshold value to a third threshold value and the condition of a driver in the device for estimating a condition of a driver according to the first embodiment.

FIG. 3 is an explanatory diagram illustrating an example of the relationship between the first threshold value to the third threshold value and the condition of the driver in the device for estimating a condition of a driver according to the first embodiment. In FIG. 3, the horizontal axis indicates the retraction amount L.

For example, the estimation unit 10 is a microcomputer constituted by a Central Processing Unit (CPU) that computes and processes acquired data according to stored programs, and a Random Access Memory (RAM) and a Read Only Memory (ROM) that are semiconductor memories. A program for operations of the estimation unit 10 and a threshold value information 100, for example, are stored in the ROM. The RAM is used as a storage region that temporarily stores computation results and the like, for example. The estimation unit 10 is configured to be able to measure time.

The threshold value information 100 is, for example, information on a threshold value regarding the retraction amount L. For example, as illustrated in FIG. 3, the estimation unit 10 has a first threshold value $Th_1$ to a third threshold value $Th_3$. The first threshold value $Th_1$ is, for example, 2 cm. The second threshold value $Th_2$ is, for example, 5 cm. The third threshold value $Th_3$ is, for example, 10 cm. The first threshold value $Th_1$ to the third threshold value $Th_3$ are determined, for example, by experiment or simulation.

As a modification, the first threshold value $Th_1$ to the third threshold value $Th_3$ may be changed, for example, according to the seasons. For example, in the season when the driver is lightly dressed (spring, summer, etc.), the threshold value is made smaller than that in the season when the driver is warmly dressed (autumn, winter, etc.), so as to estimate the condition of the driver with high accuracy.

As illustrated in FIG. 3, the estimation unit 10 estimates the condition as the condition capable of driving when the retraction amount L is smaller than the first threshold value $Th_1$, the dozing condition when the retraction amount L is equal to or greater than the first threshold value $Th_1$ and smaller than the second threshold value $Th_2$, and the condition incapable of driving when the retraction amount L is equal to or greater than the second threshold value $Th_2$.

Further, as described above, the estimation unit 10 further has the third threshold value $Th_3$ that is greater than the second threshold value $Th_2$. When the retraction amount L is equal to or greater than the third threshold value $Th_3$, the estimation unit 10 estimates a failure. This failure is, for example, a failure of the retractor 3. When estimating a failure, the device for estimating a condition of a driver 1 stops the operation and outputs a driver condition information $S_4$ that indicates the failure. The output destination of the driver condition information $S_4$ is, for example, a vehicle controller 85.

The vehicle controller 85 is, for example, a microcomputer, and controls a plurality of electronic devices of the vehicle 8. For example, when the condition of the driver is in a dozing condition, the vehicle controller 85 alerts or attempts to awaken the driver using a stimulation of five senses, such as sound, light, scent and the like. In addition, for example, when the condition of the driver is a condition incapable of driving, the vehicle controller 85 alerts the driver, and at the same time alerts the surrounding vehicle by lighting a hazard light and the like. Furthermore, the vehicle controller 85, for example, in a case where the vehicle is an automatic driven vehicle, controls each electronic device so as to stop the vehicle 8 on a road shoulder or the like.

The device for estimating a condition of a driver 1 is connected to, for example, the retractor 3 or the vehicle controller 85 via Local Area Network (LAN) of a vehicle, such as Controller Area Network (CAN) or Local Interconnect Network (LIN). Note that the device for estimating a condition of a driver 1 may output the driver condition information $S_4$ to a driving auxiliary device that enables automatic operation.

For example, as illustrated in FIG. 2, the estimation unit 10 causes an event to be generated in which the webbing 20 is retracted for a predetermined period of time X. The estimation unit 10 estimates the condition of the driver based on the retraction amount L of the webbing 20.

The estimation unit 10 of the present embodiment causes an event of retracting the webbing 20 to be generated twice, and estimates the condition of the driver based on sum of the retraction amount L and the first threshold value $Th_1$ to the third threshold value $Th_3$. The predetermined period of time X for retracting the webbing 20 is, for example, 0.5 s. The retraction of the webbing 20 of the present embodiment is performed at a predetermined cycle. Namely, the event of retracting the webbing 20 is periodically performed.

Here, when the webbing 20 is retracted by the retractor 3, a lap portion 21 of the webbing 20 illustrated in FIG. 1B presses the lower body of the driver 9 against a seat portion 81 of the driver seat 80, while a shoulder portion 22 presses the upper body of the driver 9 against a backrest portion 82 of the driver seat 80.

In the events at time $t_1$, time $t_2$, time $t_7$ and time $t_8$ illustrated in FIG. 2, the retraction amounts L are almost zero. Namely, when the driver 9 is awake, the driver is seated without leaning against the webbing 20, hence the gap between the driver seat 80 and the driver 9 is small, and the length of the webbing 20 retracted is short. Therefore, the sum of the retraction amount L is smaller than the first threshold value $Th_1$. The estimation unit 10 estimates that the condition of the driver 9 is in the condition capable of driving when the retraction amount L is smaller than the first threshold value $Th_1$ as illustrated in FIG. 3, and generates and outputs the driver condition information $S_4$ corresponding to the estimated condition of the driver.

The events at time $t_3$ and time $t_4$ illustrated in FIG. 2 indicate an example of the dozing condition. Namely, the total retraction amount $L_1$ in this event is equal to or greater than the first threshold value $Th_1$, and smaller than the second threshold value $Th_2$. Therefore, the estimation unit 10 estimates that the driver is in the dozing condition, and generates and outputs driver condition information $S_4$ corresponding to the estimated condition of the driver.

The events at time $t_5$ and time $t_6$ illustrated in FIG. 2 indicate an example of the condition incapable of driving. Namely, the total retraction amount $L_2$ in this event is equal to or greater than the second threshold value $Th_2$ and smaller than the third threshold value $Th_3$. Therefore, the estimation unit 10 estimates that the driver is in the condition incapable of driving, and generates and outputs driver condition information $S_4$ corresponding to the estimated condition of the driver.

Note that the estimation unit 10 may estimate the condition of the driver based on the retraction amount L in one retraction of the webbing 20 and the first threshold value $Th_1$ to the third threshold value $Th_3$, or the condition of the driver may be estimated based on the total retraction amount L of three or more consecutive retractions and the first threshold value $Th_1$ to the third threshold value $Th_3$.

Further, the estimation unit 10 starts retracting the webbing 20 with a predetermined torque, and controls the motor 34 so as to retract the webbing 20 in a torque range of up to a predetermined maximum value. Namely, the estimation unit 10 starts retracting for a predetermined time with a predetermined torque, and stops retracting until the torque reaches the maximum value within a predetermined period of time.

As a modification, the estimation unit 10 may estimate the condition of the driver based on the retraction amount L of the webbing 20 retracted with a predetermined torque for a predetermined period of time X. As another modification, the estimation unit 10 may estimate the condition of the driver based on the retraction amount L obtained by retracting the webbing 20 with a predetermined torque until the retraction amount L stops changing over time.

An example of operations of the device for estimating a condition of a driver 1 of the present embodiment will be described below with reference to a flowchart of FIG. 4.

Operation

The estimation unit 10 of the device for estimating a condition of a driver 1 starts measuring time when the driver gets on the vehicle and wears the seat belt by coupling the tongue portion 23 into the buckle portion 25 (Step 1).

The estimation unit 10, when a predetermined time has elapsed (Step 2), generates and outputs the driving signal $S_3$ to the motor 34 of the retractor 3, and starts an event of retracting the webbing 20 (Step 3). In this retraction event, the retraction for the predetermined period of time X is performed twice. Here, the predetermined period of time is from the time the seat belt was worn until the time the first event has started.

The estimation unit 10 acquires the retraction amount information $S_1$ from the retraction amount measuring unit 30 of the retractor 3 and compares the retraction amount L with the first threshold value $Th_1$. When the retraction amount L is smaller than the first threshold value $Th_1$ (Step 4: Yes), the estimation unit 10 estimates that the condition of the driver is in the condition capable of driving and outputs the driver condition information $S_4$ (Step 5). Subsequently, the estimation unit 10 advances the process to step 2.

Here, in step 4, when the retraction amount L is equal to or greater than the first threshold value $Th_1$ (Step 4: No), the estimation unit 10 compares the retraction amount L with the second threshold value $Th_2$. When the retraction amount L is smaller than the second threshold value $Th_2$ (Step 6: Yes), the estimation unit 10 estimates that the condition of the driver is in the dozing condition and outputs the driver condition information $S_4$ (Step 7). Subsequently, the estimation unit 10 advances the process to step 2.

Further, in step 6, when the retraction amount L is equal to or greater than the second threshold value $Th_2$ (Step 6: No), the estimation unit 10 compares the retraction amount L with the third threshold value $Th_3$. When the retraction amount L is smaller than the third threshold value $Th_3$ (Step 8: Yes), the estimation unit 10 estimates that the condition of the driver is in the condition incapable of driving and outputs the driver condition information $S_4$ (Step 9). Subsequently, the estimation unit 10 advances the process to step 2.

Then, in step 8, when the retraction amount L is equal to or greater than the third threshold value $Th_3$ (Step 8: No), the estimation unit 10 estimates a failure, outputs the driver condition information $S_4$ indicating the failure, and terminates the operation (Step 10).

Effects of the First Embodiment

The device for estimating a condition of a driver 1 according to the present embodiment can suppress misestimates of the condition of the driver. Specifically, the device for estimating a condition of a driver 1 causes an event in which the webbing 20 is retracted and estimates the condition of the driver based on the retraction amount L during the event. For this reason, compared with the case in which this configuration is not adopted, misestimates caused by the webbing 20 being pulled out as the driver changes his/her posture or grabs an object, or the like can be suppressed.

Since the device for estimating a condition of a driver 1 generates events at intervals, as compared with the case in which events are frequently generated, discomfort caused by the retraction of the webbing 20 can be reduced. Further, in the device for estimating a condition of a driver 1, since the maximum torque for the retraction is determined, the annoyance to the driver can be reduced as compared with the case in which this configuration is not adopted.

Since the device for estimating a condition of a driver 1 is constituted by the estimation unit 10 that controls the existing retractor 3 and the like, it is possible to estimate the condition of the driver without greatly changing the existing configuration of the vehicle. Therefore, the device for estimating a condition of a driver 1 can reduce the manufacturing cost.

Since the device for estimating a condition of a driver 1 outputs the driver condition information $S_4$ according to the condition of the driver, it is possible to alert the driver in the dozing condition or in the condition incapable of driving. Further, in a case where the vehicle is equipped with the driving auxiliary device as described above, the device for estimating a condition of a driver 1 is capable of stopping the vehicle on a road shoulder or the like, thereby preventing accidents, through the output of the driver condition information $S_4$, indicating that the driver is in the condition incapable of driving, to the driving auxiliary device.

Second Embodiment

A second embodiment is different from the first embodiment in that the condition of the driver is estimated by a combination of the retraction amount L and the torque T.

Figure 5A:
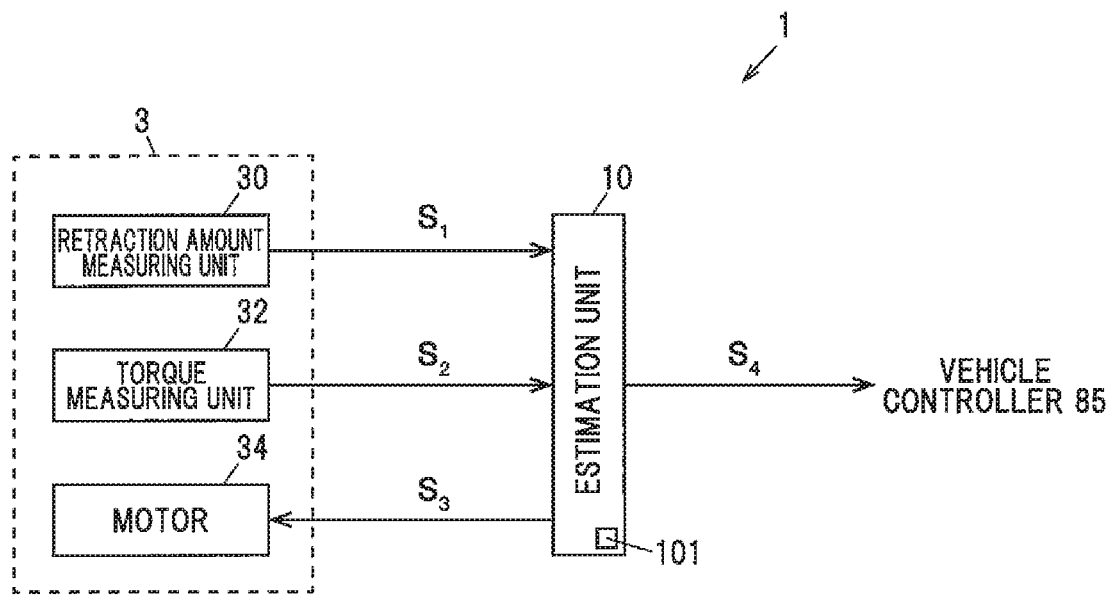
FIG. 5A is a block diagram illustrating an example of a device for estimating a condition of a driver according to a second embodiment.
Figure 5B:
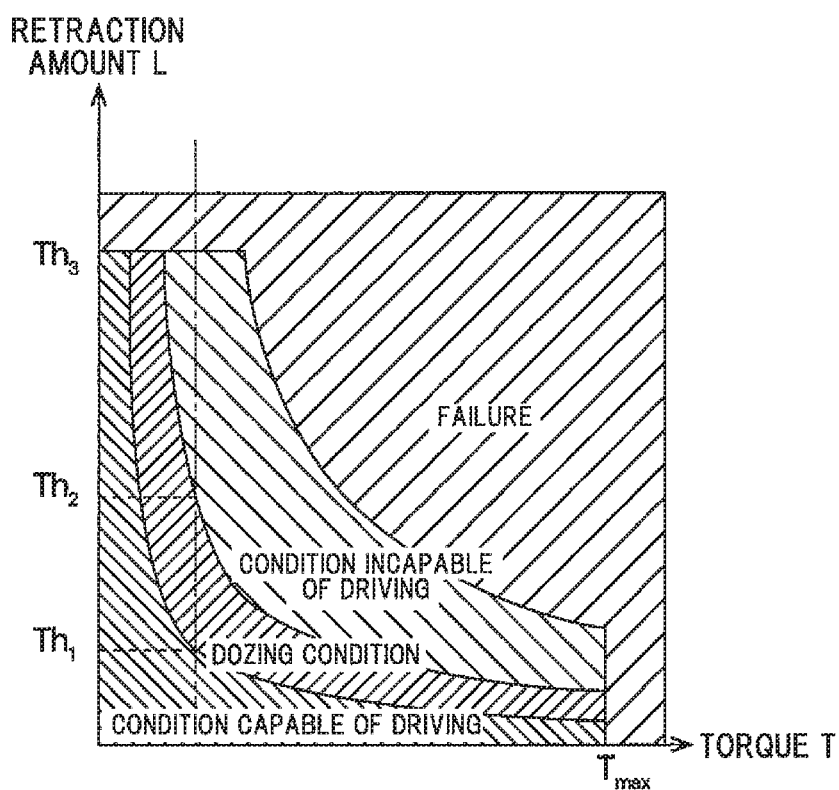
FIG. 5B is a graph illustrating an example of a relationship between the combination of the retraction amount and the torque and the condition of the driver.

FIG. 5A is a block diagram illustrating an example of a device for estimating a condition of a driver according to the second embodiment, and FIG. 5B is a graph illustrating an example of a relationship between a combination of the retraction amount and the torque, and the condition of the driver. In FIG. 5B, the vertical axis represents the retraction amount L and the horizontal axis represents the torque T. In the embodiment described below, parts having the same functions and configurations as in the first embodiment will be given the same reference numerals as in the first embodiment, and descriptions thereof will be omitted.

The estimation unit 10 according to the present embodiment is configured to estimate the condition of the driver based on a combination of torque T and the retraction amount L at the time of retraction in the event. In addition, the estimation unit 10 includes condition information 101 as illustrated in FIG. 5A.

Specifically, the estimation unit 10 estimates the condition of the driver based on the combination of the retraction amount L measured by the retraction amount measuring unit 30 of the retractor 3 when the event is generated, and the torque T measured by the torque measuring unit 32, and the condition information 101.

This retraction amount L is, for example, the total retraction amount in the event. Also, the torque T is, for example, the maximum torque in the event. Note that the torque T is not limited to the maximum torque, but may be the average value or the like of the torque in the event.

The condition information 101 of the present embodiment is, as an example, information on the condition of the driver corresponding to the combination of the retraction amount L and the torque T as illustrated in FIG. 5B. Note that this condition information 101 may be a function or a table.

The downward to the right hatched area on the left side of FIG. 5B indicates the condition capable of driving. The upward to the right hatched area next to the area indicating the condition capable of driving indicates the dozing condition. The wide downward to the right hatched area next to the area indicating the dozing condition indicates the condition incapable of driving. Further, the wide upward to the right hatched area next to the area indicating the condition incapable of driving, indicates a failure.

These boundaries are determined so that, for example, the product of the retraction amount L and the torque T is predetermined.

Note that the points of intersection between the dashed line and the boundary curves for the conditions of the driver illustrated in FIG. 5B indicate the first threshold value $Th_1$ to the third threshold value $Th_3$ of the first embodiment. Note that, as illustrated in FIG. 5B, for example, the device for estimating a condition of a driver 1 is configured to estimate such that, by setting the maximum value of the retraction amount L as the third threshold value $Th_3$, and the maximum value of the torque T as $T_{max}$, with further area estimated to be a failure.

An example of operations of the device for estimating a condition of a driver 1 of the present embodiment will be described below with reference to a flowchart of FIG. 6.

Operation

The estimation unit 10 of the device for estimating a condition of a driver 1 starts measuring the time when the driver gets on the vehicle and wears the seat belt by coupling the tongue portion 23 into the buckle portion 25 (Step 10).

The estimation unit 10, when a predetermined time has elapsed (Step 11), generates and outputs the driving signal $S_3$ to the motor 34 of the retractor 3, and starts an event of retracting the webbing 20 (Step 12).

The estimation unit 10 acquires the retraction amount information $S_1$ from the retraction amount measuring unit 30 of the retractor 3 to obtain the retraction amount L in this event and acquires the torque information $S_2$ from the torque measuring unit 32 to obtain the torque T (Step 13).

The estimation unit 10 estimates the condition of the driver corresponding to the combination of the retraction amount L and the torque T (Step 14). The estimation unit 10 generates and outputs driver condition information $S_4$ corresponding to the estimated condition of the driver to the vehicle controller 85 (Step 15). Note that the device for estimating a condition of a driver 1 terminates the process when a failure is estimated, or advances the process to step 11 in a case where a condition other than the failure is estimated.

Effects of the Second Embodiment

Since the device for estimating a condition of a driver 1 according to the present embodiment estimates the condition of the driver based on the combination of the retraction amount L and the torque T, the estimation accuracy is improved as compared with the case in which this configuration is not adopted. Further, since the device for estimating a condition of a driver 1 estimates the condition of the driver based on the combination of the retraction amount L and the torque T, conditions for estimating the condition of the driver can be set more specifically than in the case of estimating with any of the retraction amount L and the torque T.

Third Embodiment

A third embodiment differs from the other embodiments in that an event is generated according to the condition of the vehicle.

Figure 7:
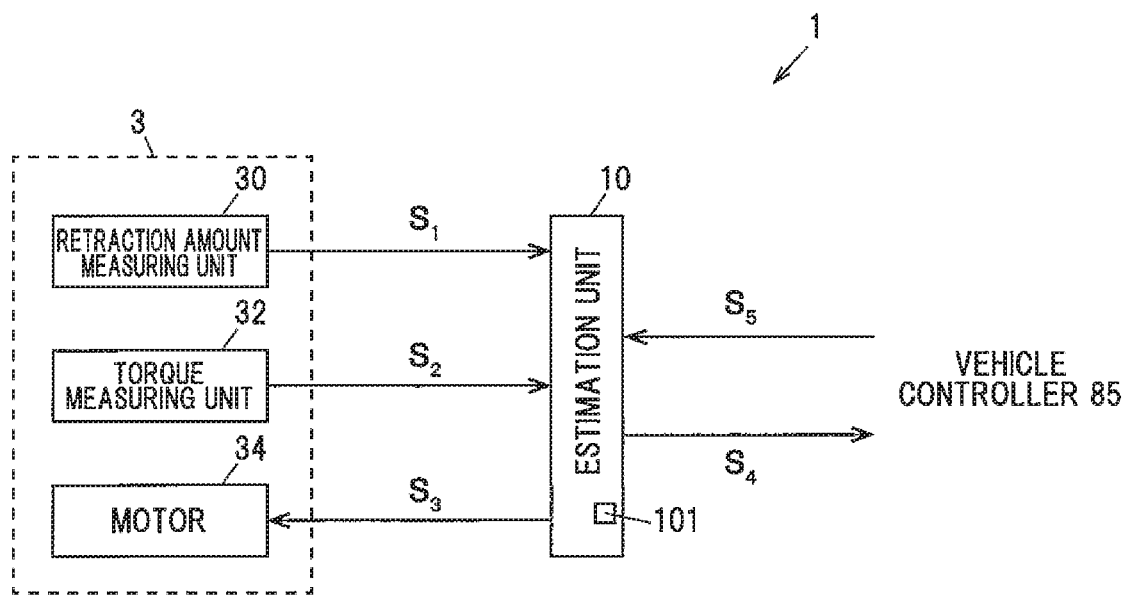
FIG. 7 is a block diagram illustrating an example of a device for estimating a condition of a driver according to a third embodiment.

FIG. 7 is a block diagram illustrating an example of the device for estimating a condition of a driver according to the third embodiment. As illustrated in FIG. 7, the device for estimating a condition of a driver 1 of the present embodiment has condition information 101 of the second embodiment.

As illustrated in FIG. 7, the estimation unit 10 of the device for estimating a condition of a driver 1 is configured to generate an event when a command signal $S_5$ based on an abnormal behavior of the vehicle is input. This abnormal behavior of the vehicle is, for example, that the vehicle is staggering, depart from the lane, or abnormally approaching a vehicle in front. Namely, the abnormal behavior of the vehicle is, for example, a behavior detected by a driving auxiliary device that controls the vehicle so as not to depart from the lane, or activates the brake device when the vehicle is approaching the vehicle in front.

The device for estimating a condition of a driver 1 is commanded to start an event based on the abnormal behavior detected by the driving auxiliary device. As a modification, the device for estimating a condition of a driver 1 may be configured as a system including such driving auxiliary device and the estimation unit 10 and the like.

An example of operations of the device for estimating a condition of a driver 1 of the present embodiment will be described below with reference to a flowchart of FIG. 8.

Operation

The estimation unit 10 of the device for estimating a condition of a driver 1 monitors whether the command signal $S_5$ is input when the driver gets on the vehicle and wears the seat belt by coupling the tongue portion 23 into the buckle portion 25 (Step 20).

When "Yes" in step 21 is satisfied, namely, when the command signal $S_5$ is input and an abnormal behavior of the vehicle is detected (step 21: Yes), the estimation unit 10 generates and outputs the driving signal $S_3$ to the motor 34 of the retractor 3, and starts an event of retracting the webbing 20 (Step 22).

The estimation unit 10 acquires the retraction amount information $S_1$ from the retraction amount measuring unit 30 of the retractor 3 to obtain the retraction amount L in this event and acquires the torque information $S_2$ from the torque measuring unit 32 to obtain the torque T (Step 23).

The estimation unit 10 estimates the condition of the driver based on the retraction amount L and the torque T (Step 24). This estimation is performed by the estimation method in the second embodiment. Note that the device for estimating a condition of a driver 1 may perform estimation according to the configuration of the first embodiment.

The estimation unit 10 generates and outputs, to the vehicle controller 85, the driver condition information $S_4$ according to the estimated condition of the driver, and terminating the processing (Step 25). Note that the device for estimating a condition of a driver 1 terminates the process when a failure is estimated, or advances the process to step 21 in a case where the condition other than the failure is estimated.

Effects of the Third Embodiment

The device for estimating a condition of a driver 1 according to the present embodiment generates an event only when the command signal $S_5$ is input from the outside, and thus the annoyance to the driver is reduced as compared with the case in which this configuration is not adopted.

Here, as another embodiment, a device for estimating a condition of a driver 1 may include, a retractor 3 configured to retract a webbing 20 of a seat belt device 2, a retraction amount measuring unit 30 configured to measure retraction amount L of the webbing 20 retracted by the retractor 3, a torque measuring unit 32 configured to measure torque T when the webbing 20 is retracted, an estimation unit 10 configured to cause an event of retracting the webbing 20 to be generated and estimate the condition of the driver based on the retraction amount L of the webbing 20, or the retraction amount L and the torque T in the event.

As a still another embodiment, the device for estimating a condition of a driver 1 may estimate the condition of the driver based on a time for retracting a predetermined retraction amount L and/or a torque at that time. At this time, the maximum time and/or the maximum torque may be set.

As still another embodiment, the device for estimating a condition of a driver 1 may estimate the condition of the driver based on the retracted amount L until the webbing cannot be retracted any further. In this case, the device for estimating a condition of a driver 1 may perform the retraction with a predetermined torque or may perform the retraction until the maximum torque is reached.

Namely, in a case where the retraction is performed until a predetermined retraction amount L is reached, the device for estimating a condition of a driver 1 estimates the condition of the driver based on whether the torque is within a certain range, whether the torque has reached a predetermined value, whether a predetermined retraction amount L has reached within a predetermined period of time, and the like. Further, in a case where the retraction is performed with a predetermined torque, the device for estimating a condition of a driver 1 estimates the condition of the driver based on the time until a predetermined retraction amount L is reached, the retraction amount L after a predetermined time has elapsed until a further retraction became impossible, and the like. In addition, in a case where the retraction is performed for a predetermined period of time, the device for estimating a condition of a driver 1 estimates the condition of the driver based on whether the torque is within a certain range, whether the torque has reached a predetermined value, whether the retraction amount L has reached a predetermined value, and the like. Among these conditions, the device for estimating a condition of a driver 1 is configured to estimate the condition of the driver based on the combination of conditions that can be implemented.

At least one of the devices for estimating a condition of a driver 1 according to the embodiments described above is capable of suppressing misestimates of the condition of the driver.

In the device for estimating a condition of a driver 1 according to the embodiment and modified example as described above, the estimation unit 10 may, depending on the application, be realized by a program executed by a computer, an application specific integrated circuit (ASIC), a field programmable gate array (FPGA), or the like.

Although several embodiments of the invention and modified examples thereof have been described above, these embodiments and modified examples are merely examples, and the invention according to claims is not intended to be limited thereto. Such novel embodiments and modified examples can be implemented in various other forms, and various omissions, substitutions, changes, and the like can be made without departing from the spirit and scope of the invention. In addition, all combinations of the features described in these embodiments and modified examples are not necessary to solve the problem of the invention. Furthermore, these embodiments and modified examples are included within the spirit and scope of the invention and also within the scope of the invention described in the claims and equivalents thereof.

REFERENCE SIGNS LIST

1 Device for estimating condition of driver
2 Seat belt device
3 Retractor
9 Driver
10 Estimation unit
20 Webbing
30 Retraction amount measuring unit
32 Torque measuring unit

The invention claimed is:

1. A driver condition estimation device, comprising an estimation unit configured to trigger an event when a webbing of a seat belt device is retracted, and to estimate a condition of a driver based on an amount of retraction of the webbing in the event,
wherein the estimation unit includes a retraction amount measuring unit that measures a webbing pull-out amount before the retraction event is triggered, and further measures a webbing pull-out amount after the retraction event has been completed,
wherein the estimation unit determines a difference between the pull-out amounts of the webbing before and after the retraction event, and estimates the condition of the driver based on the difference in the webbing pull-out amounts, and
wherein the driver conditions estimated include a condition capable of driving, a dozing condition, and a condition incapable of driving.

2. The driver condition estimation device according to claim 1, wherein the estimation unit is configured to estimate the condition of the driver based on the amount of retraction of the webbing retracted for a predetermined period of time.

3. The driver condition estimation device according to claim 1, wherein the estimation unit is configured to estimate the condition of the driver based on the amount of retraction in the event that the webbing is retracted at a predetermined torque.

4. The driver condition estimation device according to claim 1, wherein the estimation unit is configured to estimate the condition of the driver based on a combination of a torque at the time of retraction in the event and the amount of retraction.

5. The driver condition estimation device according to claim 1, wherein the estimation unit is configured to estimate the condition of the driver based on a period of time for retracting the webbing to a predetermined amount of retraction and/or a torque at that time.

6. The driver condition estimation device according to claim 1, wherein the estimation unit is configured to estimate the condition of the driver based on an amount of retraction corresponding to a maximum amount of webbing retraction that the seatbelt device is capable of at a predetermined torque limit.

7. The driver condition estimation device according to claim 1, wherein the estimation unit is configured to trigger the event when an instruction signal based on an abnormal behavior of a vehicle is input.

8. A driver condition estimation device, comprising an estimation unit configured to trigger an event when a webbing of a seat belt device is retracted, and to estimate a condition of a driver based on an amount of retraction of the webbing in the event, wherein the estimation unit is configured to estimate as the condition of the driver at least a condition capable of driving, a dozing condition and a condition incapable of driving, and wherein the estimation unit is capable of estimating the condition of the driver to be the condition capable of driving when the amount of retraction is less than a first threshold value, to be the dozing condition when the amount of retraction is not less than the first threshold value and less than a second threshold value, and to be the condition incapable of driving when the amount of retraction is not less than the second threshold value.

9. The driver condition estimation device according to claim 8, wherein the estimation unit further has a third threshold value more than the second threshold value and is configured to estimate at fault when the amount of retraction is not less than the third threshold value.

10. A driver condition estimation device, comprising an estimation unit configured to trigger an event when a webbing of a seat belt device is retracted, and to estimate a condition of a driver based on an amount of retraction of the webbing in the event,
wherein the estimation unit is configured to estimate the condition of the driver based on the amount of retraction of the webbing retracted for a predetermined period of time, and
wherein the estimation unit is configured to start retracting the webbing at a predetermined torque and stop retracting the webbing when the torque reaches a maximum value within the predetermined period of time.

11. A driver condition estimation device, comprising:
a retractor configured to retract a webbing of a seat belt device;
a retraction amount measuring unit configured to measure an amount of retraction of the webbing retracted by the retractor;
a torque measuring unit configured to measure a torque when the webbing is retracted; and
an estimation unit configured to trigger an event that the webbing is retracted and to estimate a condition of a driver based on the amount of retraction, or the amount of retraction and the torque in the event, wherein the retraction amount measuring unit measures a webbing pull-out amount before the retraction event is triggered, and further measures a webbing pull-out amount after the retraction event has been completed, wherein the estimation unit determines a difference between the pull-out amounts of the webbing before and after the retraction event, and estimates the condition of the driver based on the difference in the webbing pull-out amounts, and wherein the driver conditions estimated include a condition capable of driving, a dozing condition, and a condition incapable of driving.

12. A driver condition estimation device, comprising an estimation unit configured to periodically trigger an event wherein a seat belt device retracts a webbing that is disposed over a driver, and to estimate a condition of the driver based on an amount of retraction of the webbing in the event, wherein the estimation unit includes a retraction amount measuring unit that measures a webbing pull-out amount before the retraction event is triggered, and further measures a webbing pull-out amount after the retraction event has been completed, wherein the estimation unit determines a difference between the pull-out amounts of the webbing before and after the retraction event, and estimates the condition of the driver based on the difference in the webbing pull-out amounts, and wherein the driver conditions estimated include a condition capable of driving, and a dozing condition.

* * * * *